(12) United States Patent
Hsu

(10) Patent No.: US 8,434,980 B2
(45) Date of Patent: May 7, 2013

(54) EXPANSIBLE ANCHOR ASSEMBLY AND ITS FASTENING ADAPTOR

(75) Inventor: Tai-Ping Hsu, Alian Township, Kaohsiung County (TW)

(73) Assignee: Yow Cheng Co., Ltd., Kaohsiung County (TW)

( * ) Notice: Subject to any disclaimer, the term of this patent is extended or adjusted under 35 U.S.C. 154(b) by 385 days.

(21) Appl. No.: 12/890,644

(22) Filed: Sep. 25, 2010

(65) Prior Publication Data

US 2012/0076615 A1    Mar. 29, 2012

(51) Int. Cl.
    *F16B 13/06*    (2006.01)
(52) U.S. Cl.
    USPC ............. 411/45; 411/57.1; 411/72; 411/80.5
(58) Field of Classification Search .................... 411/15,
    411/44, 45, 54, 54.1, 57.1, 72, 77, 79, 80.5,
    411/429
    See application file for complete search history.

(56) References Cited

U.S. PATENT DOCUMENTS

| | | | | |
|---|---|---|---|---|
| 1,000,715 A | * | 8/1911 | Caywood | 411/57.1 |
| 3,213,672 A | * | 10/1965 | Orr | 73/45.8 |
| 4,235,151 A | * | 11/1980 | Udert et al. | 411/57.1 |
| 4,447,182 A | * | 5/1984 | Murbach | 411/45 |
| 4,521,147 A | * | 6/1985 | King et al. | 411/43 |
| 4,534,679 A | * | 8/1985 | White et al. | 405/259.6 |
| 4,579,490 A | * | 4/1986 | Herb | 411/32 |
| 4,653,132 A | * | 3/1987 | Yamada | 470/14 |
| 4,818,163 A | * | 4/1989 | Bereiter et al. | 411/44 |
| 5,076,746 A | * | 12/1991 | Fischer et al. | 411/55 |
| 5,688,066 A | * | 11/1997 | Loose | 403/297 |
| 5,746,557 A | * | 5/1998 | Kaibach | 411/54.1 |
| 5,791,846 A | * | 8/1998 | Mayr | 411/54.1 |
| 5,913,792 A | * | 6/1999 | Fischer | 52/698 |
| 2002/0062618 A1 | * | 5/2002 | Pourtier | 52/698 |
| 2002/0071727 A1 | * | 6/2002 | Kaibach | 405/259.1 |
| 2002/0076298 A1 | * | 6/2002 | Gauthier | 411/57.1 |
| 2008/0038079 A1 | * | 2/2008 | Bobon | 411/57.1 |

* cited by examiner

*Primary Examiner* — Roberta Delisle
(74) *Attorney, Agent, or Firm* — Banger Shia

(57) ABSTRACT

An expansible anchor assembly includes an expansion sleeve and an anchor bolt plugging and expanding the expansion sleeve. The expansion sleeve includes a first end, a second end, an expansible member adjacent to the second end that is divided into expansible segments by slits, and a bore defined in the expansion sleeve for communicating the first end with the second end. A groove is annularly formed on the expansion sleeve, and a distance from the groove to the second end equals to ¼~⅖ times a length of the expansion sleeve for preventing an over length of the slits, which is beneficial to the manufacture. During expansion, the expansible segments are completely expanded when the expansible member is subjected to a thrust from the anchor bolt to promote the anchoring force and avoid damaging a working wall.

9 Claims, 10 Drawing Sheets

EXPANSIBLE ANCHOR ASSEMBLY AND ITS FASTENING ADAPTOR

BACKGROUND OF THE INVENTION

1. Field of the Invention

The present invention relates to a bolt anchoring device, particularly to an expansible anchor assembly and its adapted fastening device.

2. Description of the Related Art

FIGS. 1 and 2 disclose a conventional expansible anchoring device 1. The anchoring device 1 includes an expansion sleeve 11 and an anchor bolt 12 extending through the expansion sleeve 11 for an expansion. Wherein, the expansion sleeve 11 includes a receiving end 111, an abutting end 112 to contact with a surface of the wall, and an expansible portion 113 having multiple slots 1131 extending from the abutting end 112 and dividing the portion 113 into expansible segments 1132 disposed adjacent to the abutting end 112, and a bore 114 defined within the expansion sleeve 11 for communicating the receiving end 111 with the abutting end 112. Further, an inner wall of the sleeve 11 has a threaded portion 1141 disposed close to the receiving end 111, a propelling leg 1142 disposed close to the abutting end 112, and a supporting portion 1143 disposed between the threaded portion 1141 and the propelling leg 1142. The propelling leg 1142 is formed into a cone shape tapered from the supporting portion 1143 toward the abutting end 112. In addition, the anchor bolt 12 includes a plug body 121 for extending through the supporting portion 1143 and an insert 122 extending outwardly from the plug body 121 for abutting with respect to the propelling leg 1142.

Referring to FIG. 3, in operation, the expansion sleeve 11 of the anchoring device 1 is subjected to a knocking force and plugged a pre-drilling hole 21 of a wall 2 so as to fix the anchoring device 1 therein. Further, the insert 122 of the anchor bolt 12 thence moves toward the propelling leg 1142 when users use a tool (not shown) to axially push the plug body 121 through the bore 114 of the sleeve, with the result that the expansible portion 113 subjected to an outward expansion force makes the expansible segments 1132 expanded to maintain the anchoring force. Then, a screw 3 could be screwed along the threaded portion 1141 for accomplishing the installation of the anchoring device 1.

Generally, the expansible portion 113 along with the slits 1131 is prolonged for which to be efficiently expanded under the pushing force of the anchor bolt 12. It is because the anchor bolt 12 easily lacks sufficient moment force and fails to completely widen the expansible segments 1132 of the portion 113 in case the expansion portion 113 is designed quite shorter. In contrast, the expansion portion 113 designed quite longer as shown in the aforementioned convention configuration may allow the anchor bolt 12 to successfully expand the expansion portion 113, but at the beginning when the portion 113 starts to expand, the expansion turns to direct against the hole 21, which restricts the pursuing expanding and renders the expansion portion 113 unable to be spread as dotted in FIG. 3, namely the dimension of the expansion is diminished and hence the anchoring force of the device 1 is influenced. If the expansion portion 113 is otherwise over-expanded, the pre-drilled hole 21 would be subjected to a huge pressure, which however results in breaking or damaging the wall 2 during operation and decreasing the anchoring force. To a practical experiment, as it is the anchoring device 1 can only be slightly but not thoroughly expanded even though the anchor bolt 12 bears a huge knocking force.

Still further, when the user pushes and directs the anchor bolt 12 against the propelling leg 1142, he or she cannot exactly judge whether the anchor bolt 12 is completely plugged in the propelling leg 1142 or not, instead, they merely determine in light of their experiences. The expansible portion 113 is over lengthened, with the result that the user usually cannot be successful in expecting the propelling or anchoring journey of the anchor bolt 12 destined for the propelling leg 1142. In such a situation, the anchor bolt 12 fails to widen the propelling leg 1142 completely, which results in decreasing the anchoring force of the expansible portion 113, even deteriorating or fading away the anchoring force in case that the anchor bolt 12, which does not completely rest against the propelling leg 1142, is subjected to any external vibration and thus slipped out of the propelling leg 1142. Therefore, the fixing effect is easily affected.

Furthermore, in view of the over-length expansible portion 113 along with the prolonged slots 1131 and the propelling leg 1142 in a cone shape, if an overlarge force imposed on the cutting of the slots 1131 would easily render the slots to lose a support and become deformed during cutting of the manufacture, which however increase the difficulty of shaping by relevant cutting tools.

SUMMARY OF THE INVENTION

The object of the present invention is to provide an expansible anchor assembly and its fastening adaptor which facilitates the convenience of manufacture and attains to expand completely without damaging the anchored wall for increasing the anchoring force thereof.

An expansible anchor assembly of the present invention comprises an expansion sleeve and an anchor bolt extending through the expansion sleeve for expanding the expansion sleeve. Wherein, the expansion sleeve includes a first end, a second end, an expansible member disposed adjacent to the second end, on which a plurality of slits axially extend from the second end for dividing the expansible member into multiple expansible segments, a bore defined inside the expansion sleeve for communicating the first end with the second end, and a groove annularly formed at a periphery of the sleeve. An inner wall of the expansion sleeve further includes a threaded portion disposed adjacent to the first end, a propelling leg disposed adjacent to the second end, and a supporting portion disposed between the threaded portion and the propelling leg. A proportion of distance from the groove to the second end equals to $1/4$~$2/5$ times a length of the expansion sleeve. Furthermore, the anchor bolt comprises a plug body for extending through the supporting portion and an insert extending outwardly from the plug body for being in radial abutment against the propelling leg. By means of such a proportion, the present invention prevents the slits from being set by an over length, which not only develops the convenience of manufacture but renders the expansible segments able to widen axially starting from the groove for completely expanding the expansible member, so as to raise the anchoring force of the present invention and also avoid damaging the working piece during expansion.

Preferably, a convex portion extends outward from the first end and provides a diameter larger than a diameter of the expansion sleeve.

Preferably, the slits are extended in a length at least equal to a distance between the second end and the groove.

Preferably, the expansion sleeve has a plurality of anti-loosen ribs formed on a periphery thereof.

Preferably, the plug body of said anchor bolt has a plurality of annular ribs disposed thereon.

A fastening device in accordance with the present invention that is adapted to the instant expansible anchoring assembly comprises a shank, an adjustable assembly engaged with the shank, an elastic unit situated in the adjustable assembly for the shank to penetrate therethrough. Wherein, a knocking end is formed on one end of the shank, and a pushing end is formed on the other end thereof for inserting into the expansible anchoring assembly; the adjustable assembly includes a first body penetrated by the shank and a second body capable of displacing along the shank for cooperating with the first body. The first body and the second body oppositely forming respective first slots and second slots disposed at intervals, every two adjacent first slots form a first rib, and every two adjacent second slots form a second rib, the first body and the second body connect with each other by mutually engagement the first and the second slots with the second and the first ribs so as to adjust a projecting length of the shank from the adjustable assembly. Further, a room is formed within the second body for receiving the elastic unit.

Preferably, a blocking portion projects from the shank to fix and integrate with the first body.

Preferably, a limiting plate is disposed on the shank for keeping the elastic unit inside the adjustable assembly.

Preferably, the first slots and the first ribs of the first body respectively have first engaging parts, and second engaging parts relative to the first engaging parts are formed on the second slots and the second ribs of the second body, respectively.

The advantages of the present invention over the known prior arts will become more apparent to those of ordinary skilled in the art upon reading following descriptions in junction with the accompanying drawings.

DETAILED DESCRIPTION OF THE PREFERRED EMBODIMENTS

Figure 1:
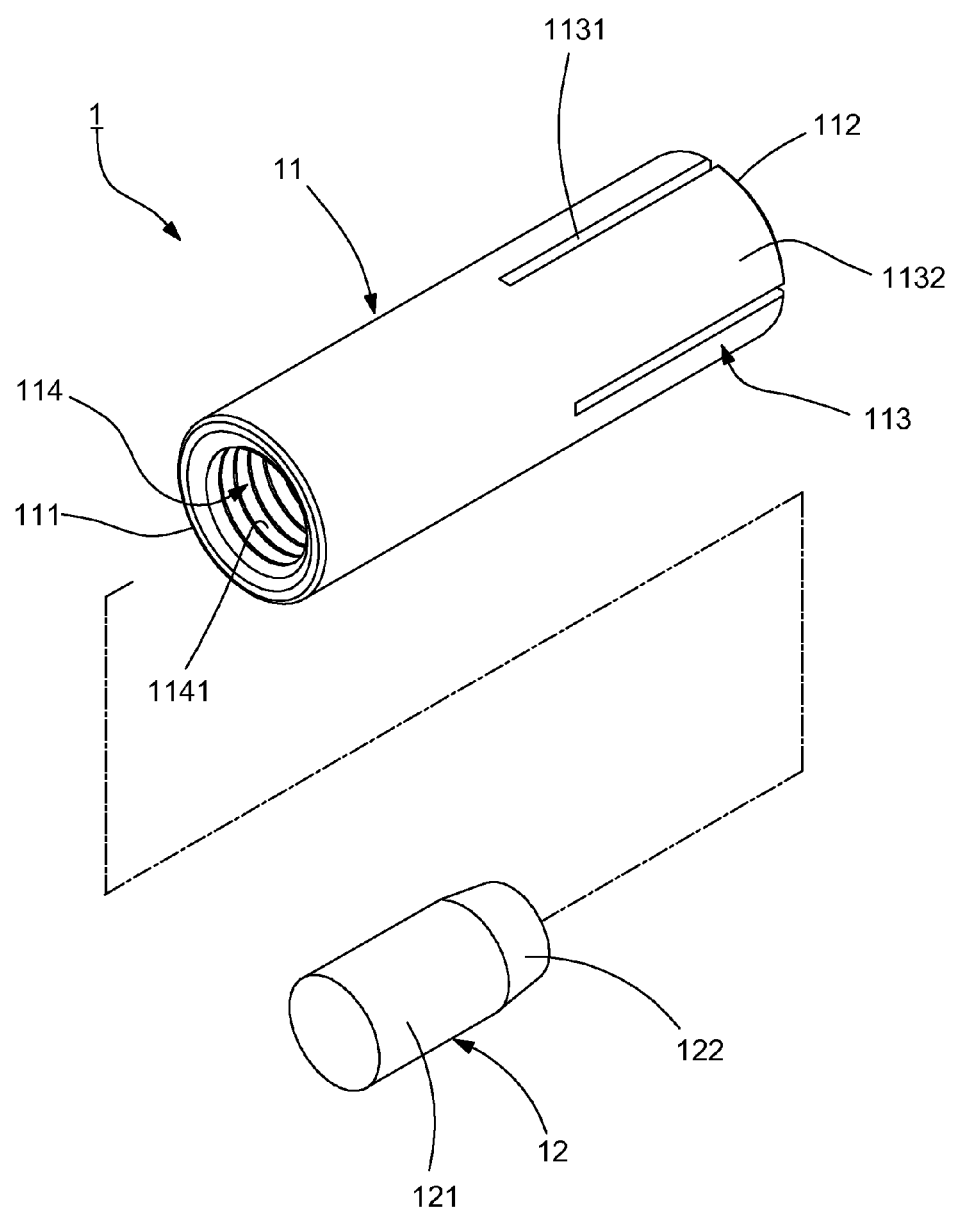
FIG. 1 is an exploded view showing a conventional anchoring assembly.
Figure 2:
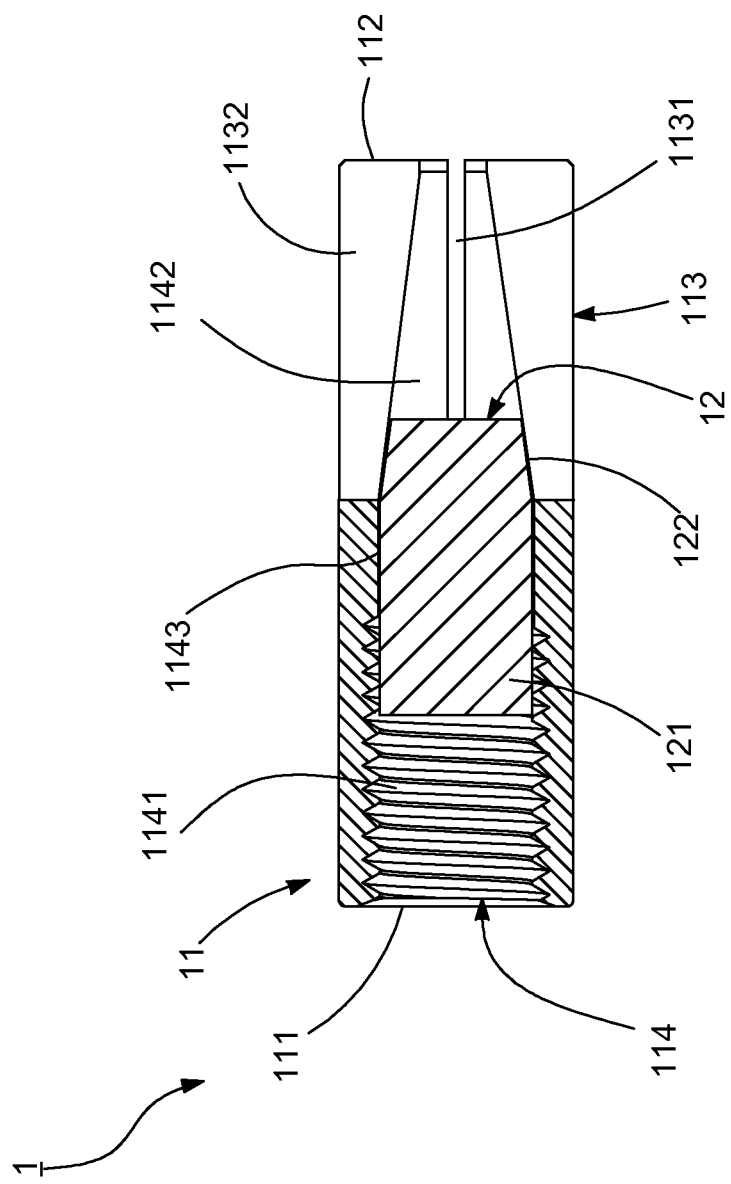
FIG. 2 is a cross-sectional view showing of FIG. 1.
Figure 3:
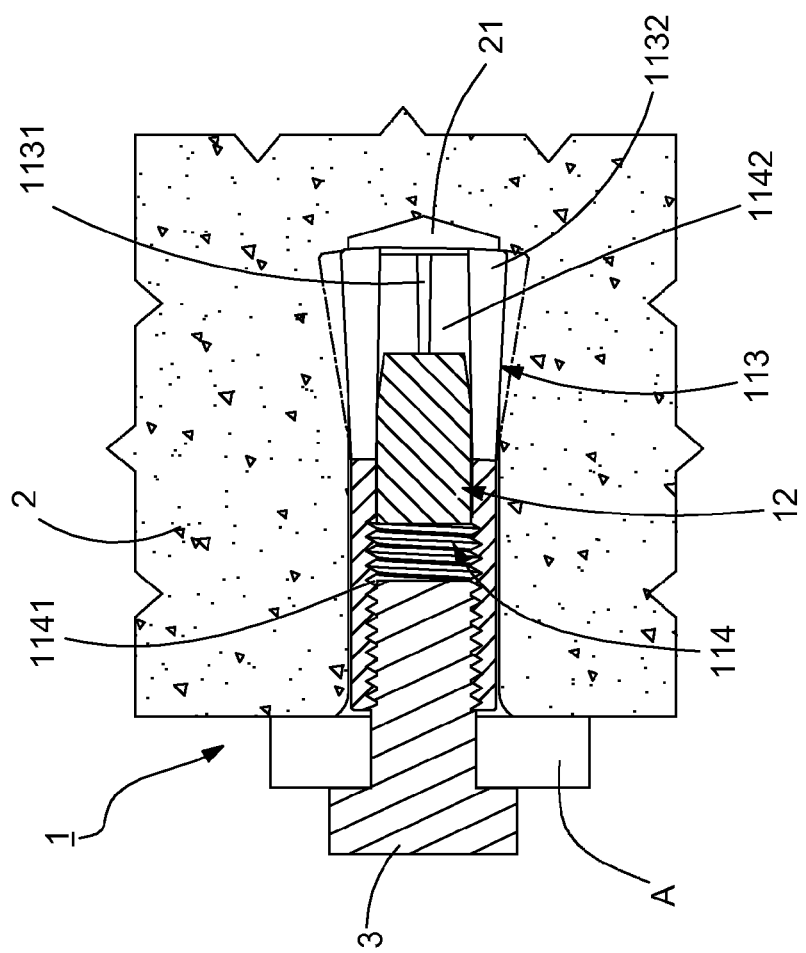
FIG. 3 is a schematic view showing of FIG. 1 in operation.

Before the present invention is described in greater detail, it should be noted that the like elements are denoted by the same reference numerals throughout the disclosure.

Figure 4:
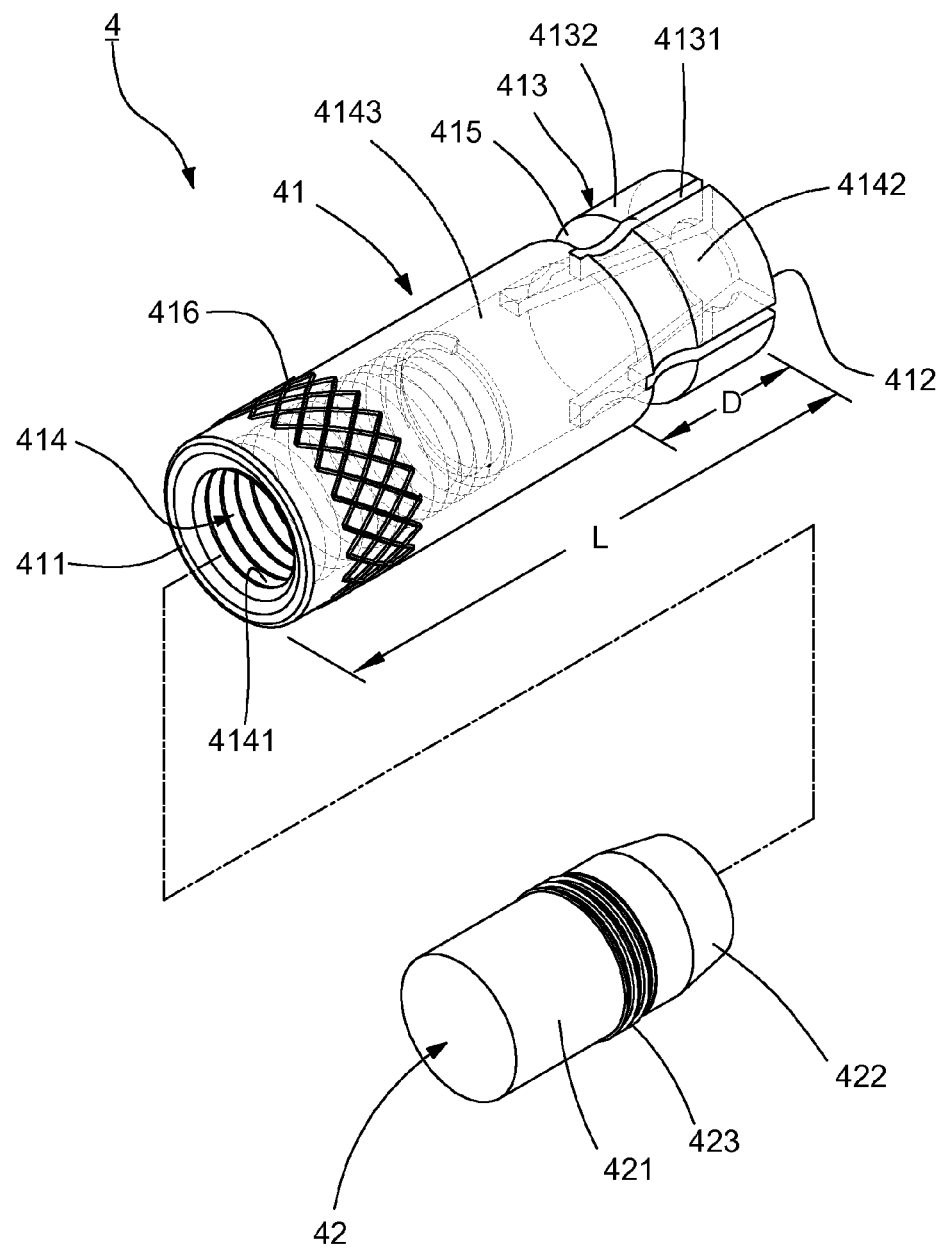
FIG. 4 is an exploded view showing a first preferred embodiment of the present invention.
Figure 5:
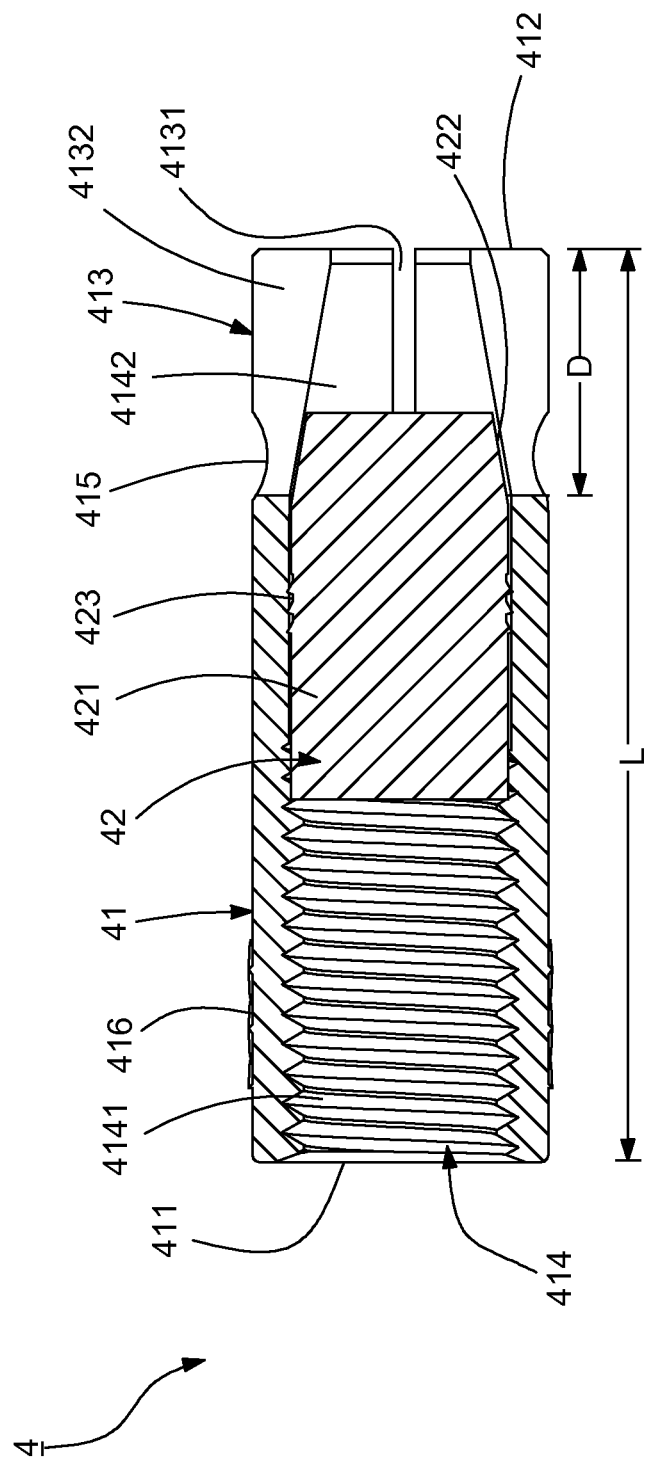
FIG. 5 is a cross-sectional view showing of FIG. 4.

FIGS. 4 and 5 show a first preferred embodiment of the present invention. An expansible anchoring assembly 4 in accordance with the present invention comprises an expansion sleeve 41 and an anchor bolt 42 plugging or extending through the expansion sleeve 41 for an expansion. Wherein, the expansion sleeve 41 includes a first end 411, a second end 412, an expansible member 413 disposed adjacent to the second end 412 on which a plurality of slits 4131 axially extend from the second end 412 for defining a plurality of expansible segments 4132, a bore 414 defined inside the expansion sleeve 41 for communicating the first end 411 with the second end 412. An inner wall of the expansion sleeve 41 further includes a threaded portion 4141 disposed adjacent to the first end 411, a propelling leg 4142 disposed adjacent to the second end 412, and a supporting portion 4143 disposed between the threaded portion 4141 and the propelling leg 4142. The propelling leg 4142 is extendedly formed into a cone shape tapered from the supporting portion 4143 to the second end 412.

In addition, the expansion sleeve 41 further includes a groove 415 annually disposed at a periphery thereof, and a diameter D between the groove 415 and the second end 412 equals to ¼ (0.25)~⅖ (0.4) times a length L of the expansion sleeve 41. Preferably, at the periphery of the expansible sleeve 41, maybe disposed about the groove 415, a plurality of anti-loosen ribs 416 are disposed. With regard to the slits 4131, the slits 4131 may be extended in a length at least as the same as the distance D between the second end 412 and the groove 415, or alternatively, to be extended beyond the groove 415, namely, exceeding the distance D. It is ideal that the extended length of the slits 4131 is extended beyond 1 centimeter upper than the groove 415. In the preferred embodiment, the slits 4131 are designed to extend beyond the groove 415 as an example.

The anchor bolt 42 comprises a plug body 421 for extending through the supporting portion 4143 and an insert 422 extending outwardly from the plug body 421 for being in radial abutment against the propelling leg 4121. Also in the preferred embodiment, the plug body 421 includes a plurality of annular ribs 423 disposed thereon.

Figure 6:
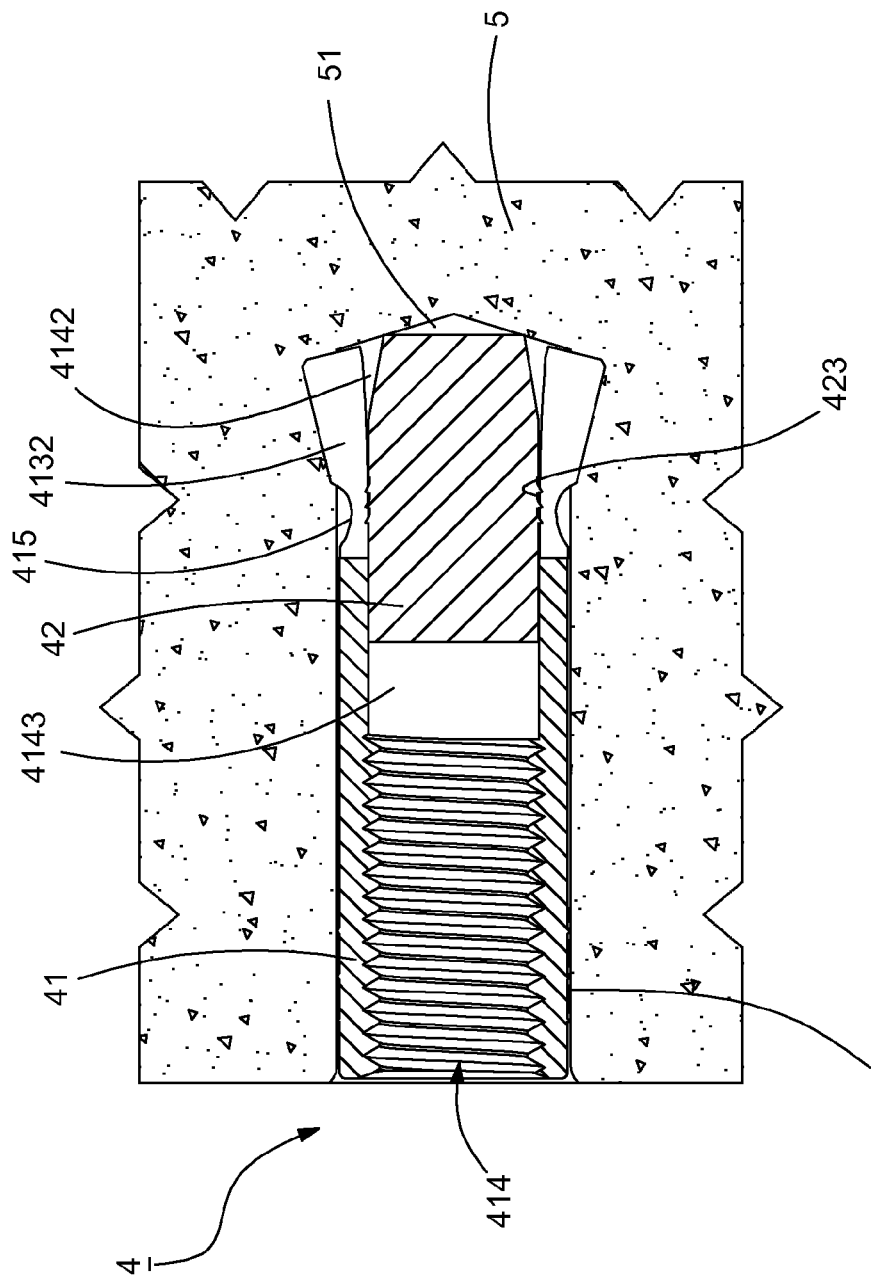
FIG. 6 is a schematic view showing of FIG. 4 in operation.

In operation, as shown in FIG. 5 and FIG. 6, when the expansible anchor assembly 4 is initially inserted into a pre-drilling hole 51 of a wall 5 via a knocking force, users would penetrate a tool (not shown) through the bore 414 for pushing the anchor bolt 42 to move from the supporting portion 4143 to the conical propelling leg 4142. At the same time, the configuration of the groove 415 substantially attenuates the sleeve thickness of the place at which the groove 415 is located on the expansible anchor assembly 41 so as to reduce the rigidity of the expansible segments 4132. Thus, the anchor bolt 42 provided with sufficient moment force is allowed thrusting into the propelling leg 4142, so that concurrently the expansible segments 4132 could be bend outward starting from the groove 415 for densely fitting within the hole 51. In addition, the distinct proportion as defined would also reduce the difficulty for cutting or shaping the slits and hardly become deformed even though the slits 4131 are subjected to an overlarge force during the cutting procedure, which is beneficial to increase the convenience of manufacture. Also, the smaller contacting area between the expansible member 413 and the hole 51 is conducive to a reduced pressure imposed on the hole 51, so as to avoid damaging the wall 5 during expansion or widening of the expansible segments 4131 of the expansible member 413. The shorter length of slits 4131 not only benefits the fall in manufacturing time but renders the journey of pushing the anchor bolt 42 toward the propelling leg 4142 become shorter as well for the user to easily and completely rest the anchor bolt 42 against the propelling leg 4142. Thus, the expansible segments 4132 can be fully widened and expanded by the force exerted from the anchor bolt 42 for promoting the anchoring force of the expansible member 413. As it is the distance D from the groove 415 to the second end 412 smaller than ⅖ (0.4) times the length L of the expansion sleeve 41, it prevents from over-lengthening the slits 4131 and avoids great difficulties in manufacturing and breaking the wall during expansion of the expansible member 413. Besides, the distance D from the groove 415 to the second end 412 larger than ¼ (0.25) times the length L of the expansion sleeve 41 promotes the expansible member 413 to be fully expanded and widened. As a result, the distinct distance D is designed to preferably increase the anchoring force of the expansible anchoring assembly 4.

Still further, the arrangement of the anti-loosen ribs 416 disposed around the periphery of the expansible sleeve 41 could increase the friction resistance between the sleeve 41 and the hole 51, so as to attain a dense engagement of the expansible anchor assembly 4 with the hole 51 of the wall 5. Accompanying with the annular ribs 423 disposed on the plug body 421 of the anchor bolt 42, such configuration further allows the ribs 423 to engage with the slits 4131 when the anchor bolt 42 is completely pushed or inserted into the propelling leg 4142, so as to prevent the anchor bolt 42 from slipping out of the propelling leg 4142 and thus maintain the anchoring force. Moreover, once the anchor bolt 42 abuts against the propelling leg 4142 for a complete expansion, the anchor bolt 42 threatened with any external vibration is hardly slip out of the leg 4142, which thus reinforces the fixing and anchoring capability of the expansible anchor assembly 4. Thereafter, a screw (not shown) could be screwed along the threaded portion 4141 for accomplishing the installation of the anchoring device 1.

Figure 7:
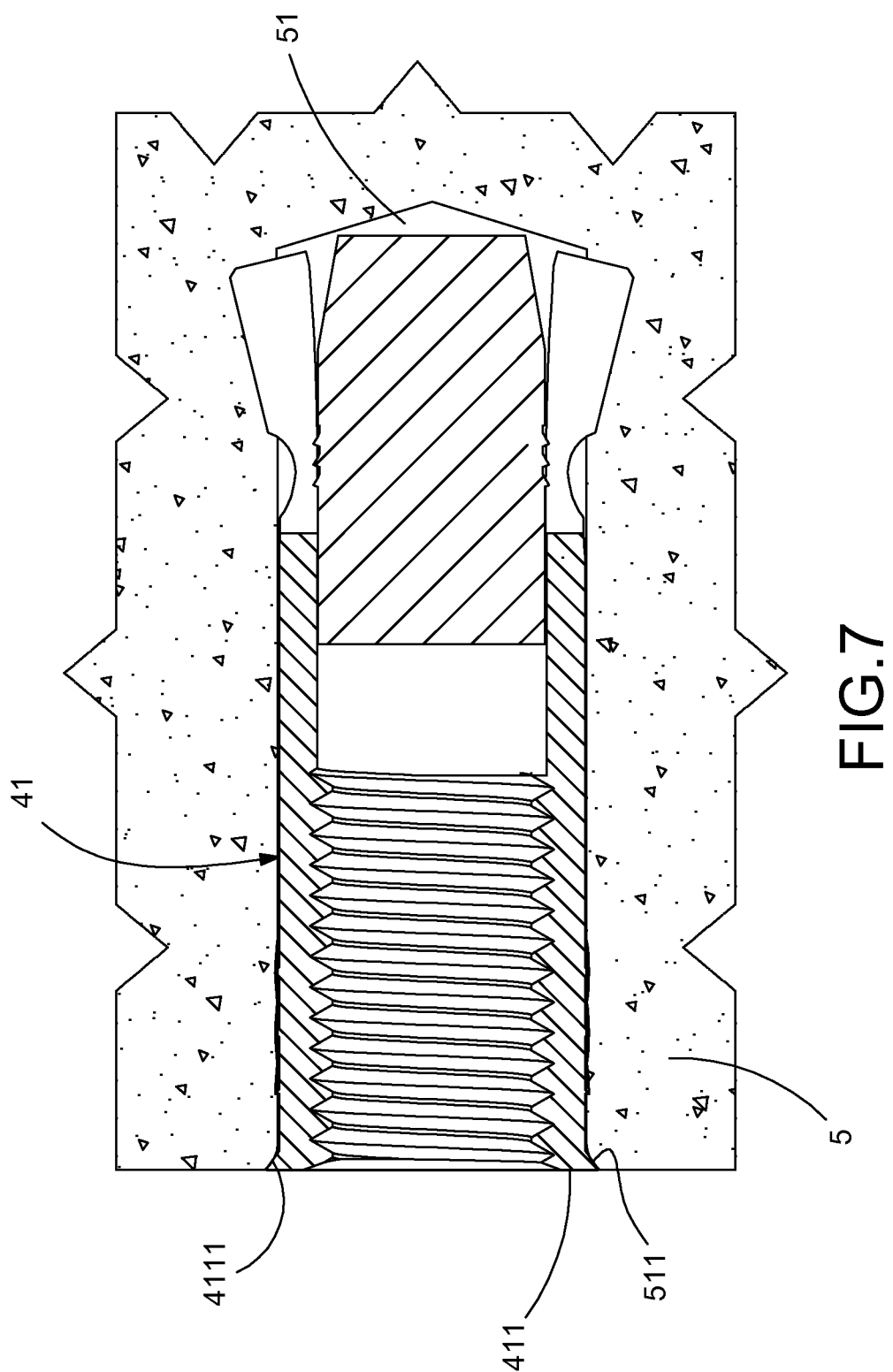
FIG. 7 is a schematic view showing a second preferred embodiment of the present invention.

FIG. 7 shows a second preferred embodiment of the present invention. An expansible anchoring assembly 4 different from the previous embodiment particularly comprises a convex portion 4111 extending outward from the first end 411, whose diameter is larger than the sleeve diameter. When the wall 5 is pre-drilled for digging a hole 51, it is common to form a beveled and funnel-like surface 511 at the surface of the hole 51. In virtue of the design of the convex portion 4111 that preferably matches and engages with the beveled surface 511, the expansion sleeve 41 can be fitly anchored in the hole 51 of the wall 5 to enhance the anchor force.

Figure 8:
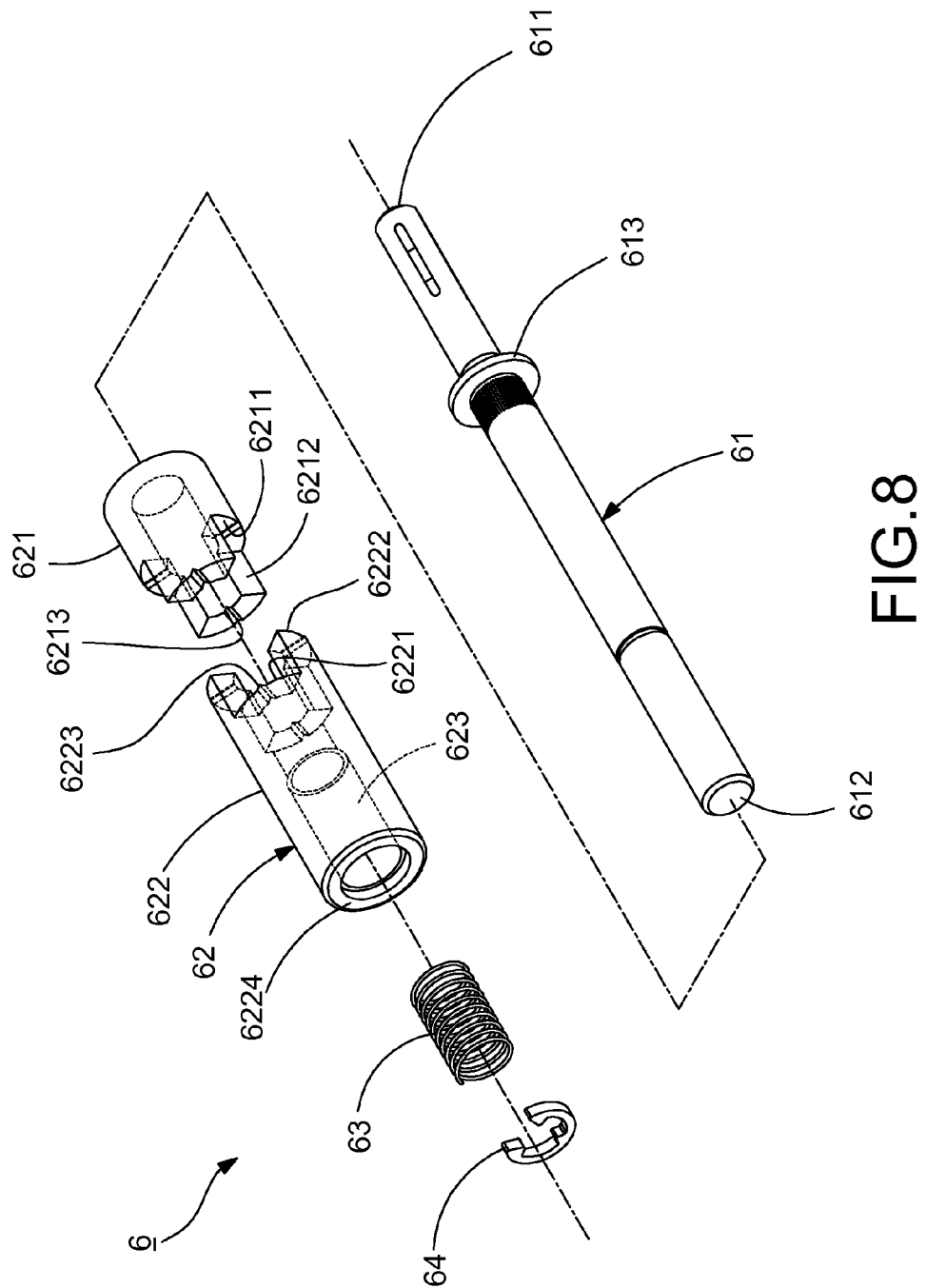
FIG. 8 is an exploded view showing a third preferred embodiment of the present invention.

Referring to FIG. 8 shows a third embodiment of the present invention. The expansible anchoring assembly as aforementioned can cooperate with a fastening device 6. The fastening device 6 comprises a shank 61, an adjustable assembly 62 engaged with the shank 61, an elastic unit 63 situated in the adjustable assembly 62 for the shank 61 to penetrate therethrough, and a limiting plate 64 disposed thereon for keeping the elastic unit 63 inside the adjustable assembly 62. Wherein, a knocking end 611 is formed on one end of the shank 61, and a pushing end 612 is formed on the other end thereof for inserting into the expansible anchoring assembly.

In connection with the adjustable assembly 62, it comprises a first body 621 penetrated by the shank 61, and a second body 622 capable of displacing along the shank 61 for cooperating with the first body 621. The shank 61 can be designed to integrate with the first body 621, or the shank 61 can use a blocking portion 613 projecting therefrom to integrate with the first body 621. Herein, the design of the blocking portion 613 is adopted. Further, far from the first body 621, the second body 622 forms a distal end 6224. The first body 621 and the second body 622 oppositely form respective first slots 6211 and second slots 6221 disposed at intervals. Every two adjacent first slots 6211 form a first rib 6212, and every two adjacent second slots 6221 form a second rib 6222. To promote the firm engagement between the slots 6211,6221 and the ribs 6212,6222, the first slots 6211 and the first ribs 6212 respectively have the structure of first engaging parts 6213. Relative to the first engaging parts 6213, second engaging parts 6223 are formed on the second slots 6221 and the second ribs 6222 as well. A room 623 is also formed within the second body 622 for receiving the elastic unit 63.

Figure 9:
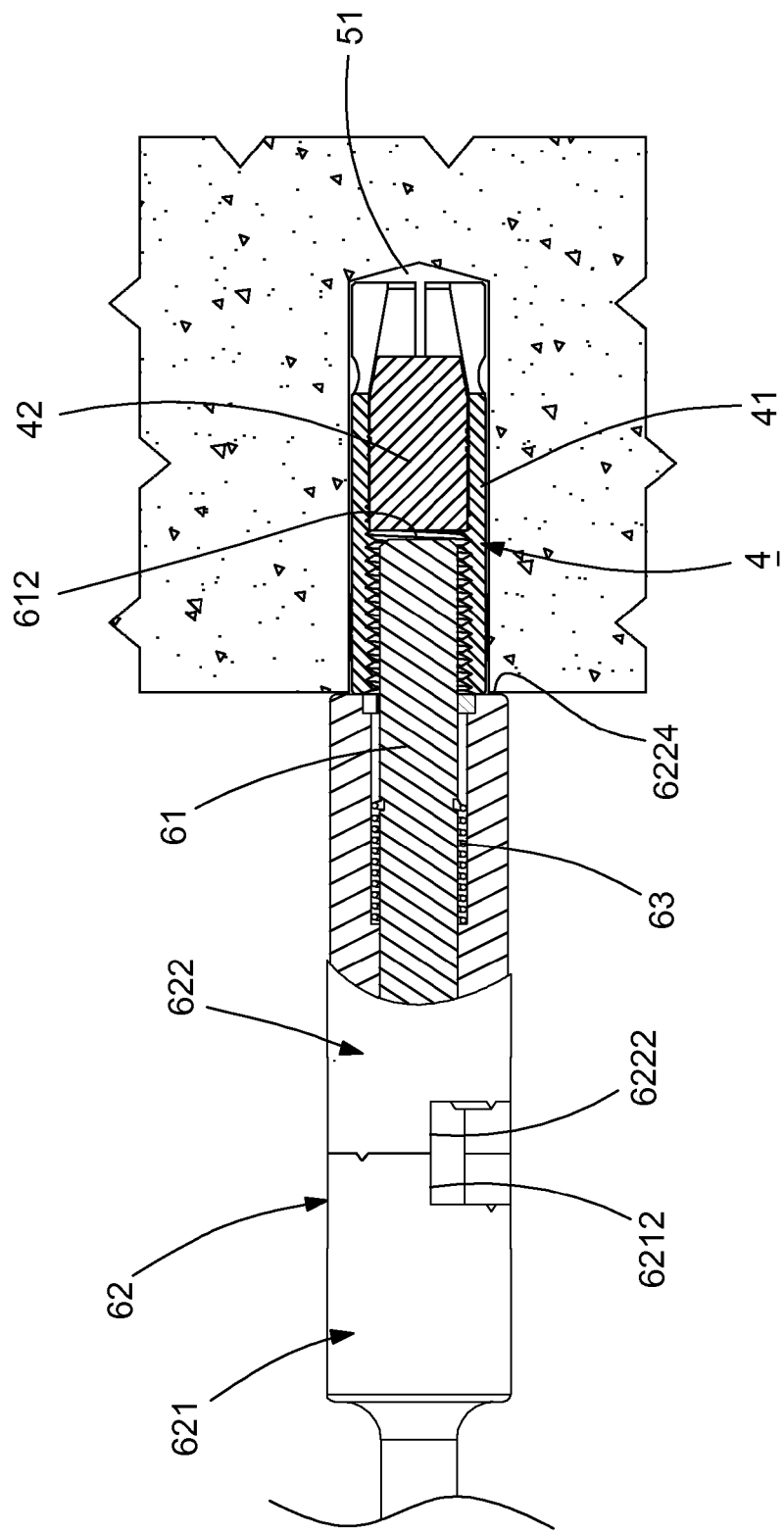
FIG. 9 is a schematic view showing the third embodiment in operation.

Referring to FIG. 9, when users want to force the expansion sleeve 41 of the anchoring assembly 4 into the pre-drilling hole 51, they should adjust, namely rotate the shank 61 integrating with the first body 621 or rotate the second body 622 so as to fitly prop the first rib 6212 against the second rib 6222. During adjustment, the elastic unit 63 susceptible of a compression from the second body 622 would restore its elasticity, by which the first ribs 6212 and the second ribs 6222 can turn to engage with each other. Thence, the projecting length of the shank 61 from the second body 622 could be shortened, which allows the pushing end 621 to push the expansion sleeve 41 into the hole 51 without touching the anchor bolt 42 when the distal end 6224 of the second body 621 fitly reaches the wall surface. Thus, the expansion sleeve 41 is initially anchored inside the wall 5.

Figure 10:
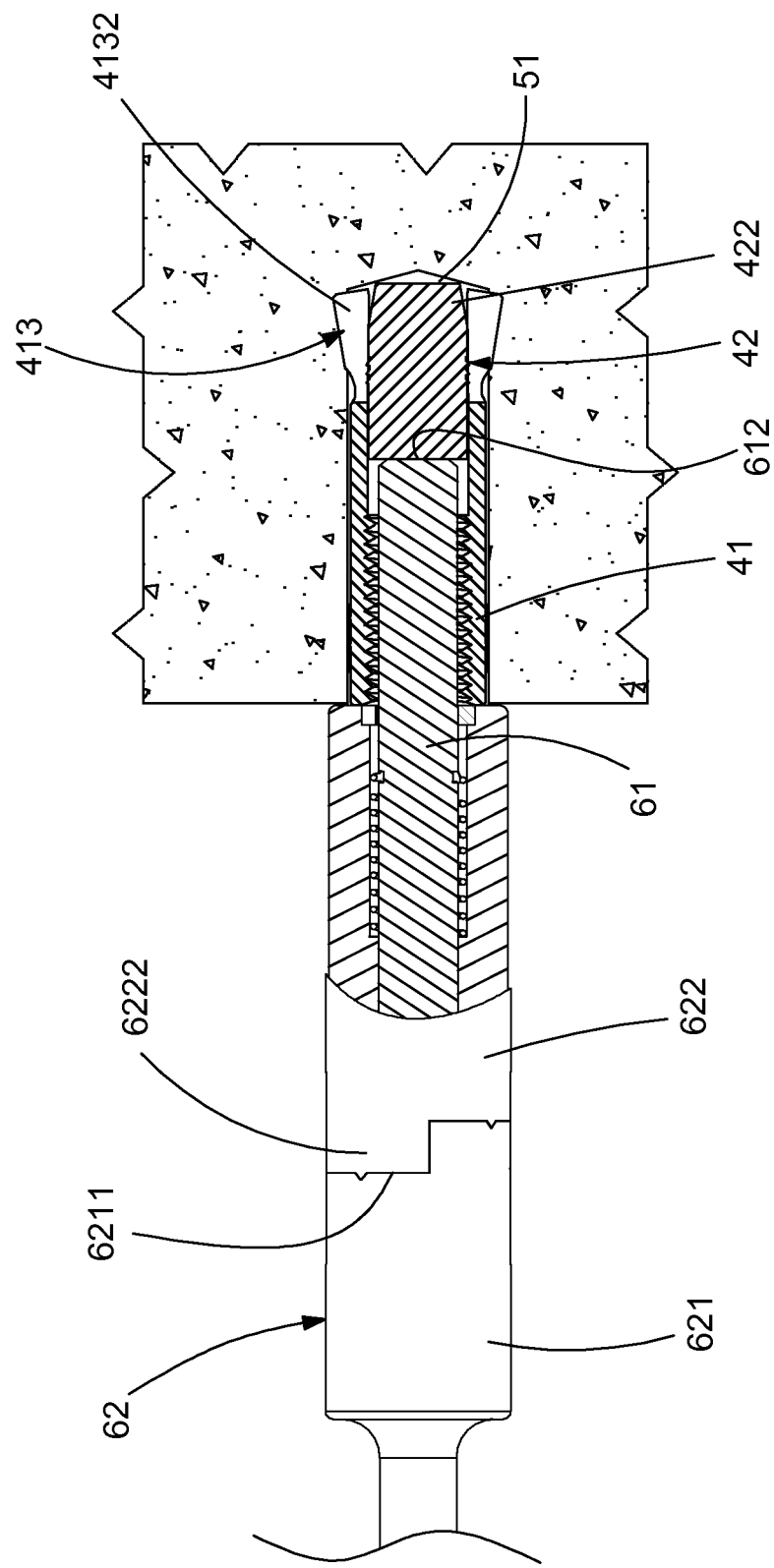
FIG. 10 is another schematic view showing the third embodiment in operation.

Continuing with the aforementioned, FIG. 10 shows that when the expansion sleeve 41 is anchored into the hole 51, users should then adjust the adjustable assembly 62 again, that is, rotate the first or the second body 621,622 to render the second ribs 6222 able to snap into the first slots 6211 for a relative engagement. The shank 61 would project longer, and the projecting length would be preferably equal to the route distance of pushing the anchor bolt 42, so that the pushing end 612 accurately propel the insert 422 of the anchor bolt 42 end to the propelling legs 4142 and completely push the expansible segment 4132 of the expansible member 413 open to increase the anchor force. Therefore, the present invention not only solves the problem of failing to thoroughly anchor the bolt into the wall hole but increases the using convenience.

To sum up, the present invention takes advantage of the groove annually disposed around the expansible sleeve and a distance measured from the groove to the second end that is ¼~⅖ times the length of the expansion sleeve. Accordingly, the present invention prevents the slits to be set in an over length, which not only develops convenience of the manufacture but renders the expansible segments able to widen starting from the groove for completely expanding the expansible member so as to raise the anchoring force within a supporting wall.

While we have shown and described the embodiment in accordance with the present invention, it should be clear to those skilled in the art that further embodiments may be made without departing from the scope of the present invention.

What is claimed is:

1. An expansible anchor assembly comprising: an expansion sleeve including a first end, a second end, an expansible member disposed adjacent to said second end, and a bore defined inside said expansion sleeve for communicating said first end with said second end and allowing said anchor bolt to extend therethrough, said expansible member having a plurality of slits axially extending from said second end, on which a plurality of expansible segments are divided by said slits, an inner wall of said expansion sleeve including a threaded portion in the proximity of said first end, a propelling leg disposed in the proximity of said second end, and a supporting portion disposed between said threaded portion and said propelling leg, said propelling leg being in a conical extension tapered from said supporting portion toward said second end; and an anchor bolt plugging said expansion sleeve for expanding said expansion sleeve, wherein, said anchor bolt comprising a plug body for extending through said supporting portion and an insert extending outwardly from said plug body for being in radial abutment against said propelling leg; wherein, a groove is annularly formed at a periphery of said expansion sleeve for concentrically communicating with the expansible member, a distance measured from said groove to said second end being equal to ¼~⅖ times a length of said expansion sleeve.

2. The expansible anchor assembly as claimed in claim 1, wherein, a convex portion extends outward from said first end and provides a diameter larger than a diameter of said expansion sleeve.

3. The expansible anchor assembly as claimed in claim 1, wherein, said slits are extended in a length at least equal to said distance between said second end and said groove.

4. The expansible anchor assembly as claimed in claim 1, wherein, said expansion sleeve has a plurality of anti-loosen ribs formed on a periphery thereof.

5. The expansible anchor assembly as claimed in claim 1, wherein, said plug body of said anchor bolt has a plurality of annular ribs disposed thereon.

6. A fastening device that is adapted to the expansible anchoring assembly as defined in claim 1 comprising: a shank, an adjustable assembly engaged with said shank, an elastic unit situated in said adjustable assembly for said shank to penetrate therethrough, wherein, a knocking end is formed on one end of said shank, and a pushing end is formed on the other end thereof for inserting into said expansible anchoring assembly; said adjustable assembly comprising a first body penetrated by said shank and a second body capable of displacing along said shank for cooperating with said first body, said first body and said second body oppositely forming respective first slots and second slots disposed at intervals, every two adjacent first slots forming a first rib, and every two adjacent second slots forming a second rib, said first body and said second body connecting with each other by mutually engagement said first and said second slots with said second and said first ribs so as to adjust a projecting length of said shank from said adjustable assembly, a room being formed within said second body for receiving said elastic unit.

7. The fastening device as claimed in claim 6, wherein, a blocking portion projects from said shank to fix and integrate with said first body.

8. The fastening device as claimed in claim 6, wherein, a limiting plate is disposed on said shank for keeping said elastic unit inside said adjustable assembly.

9. The fastening device as claimed in claim 6, wherein, said first slots and said first ribs of said first body respectively have first engaging parts, and second engaging parts relative to said first engaging parts are respectively formed on said second slots and said second ribs of said second body.

\* \* \* \* \*